United States Patent
Huang et al.

(10) Patent No.: US 7,511,795 B2
(45) Date of Patent: Mar. 31, 2009

(54) APPARATUS FOR DETECTING CELL GAP OF A LIQUID CRYSTAL DISPLAY PANEL

(75) Inventors: Tai-Chi Huang, Tao Yuan Shien (TW); Chih-Liang Liao, Tao Yuan Shien (TW)

(73) Assignee: Au Optronics Corporation, Hsin-Chu (TW)

( * ) Notice: Subject to any disclaimer, the term of this patent is extended or adjusted under 35 U.S.C. 154(b) by 379 days.

(21) Appl. No.: 11/365,516

(22) Filed: Mar. 2, 2006

(65) Prior Publication Data
US 2006/0203180 A1    Sep. 14, 2006

(30) Foreign Application Priority Data
Mar. 10, 2005    (TW) .............................. 94107286 A

(51) Int. Cl.
*G02F 1/13*    (2006.01)
*G01B 11/06*    (2006.01)

(52) U.S. Cl. ...................................... 349/187; 356/632

(58) Field of Classification Search .................. 349/187; 356/625, 630, 632
See application file for complete search history.

(56) References Cited

U.S. PATENT DOCUMENTS

| | | | |
|---|---|---|---|
| 6,198,520 B1 * | 3/2001 | Kondo et al. ................. | 349/141 |
| 7,218,394 B2 * | 5/2007 | Murakami et al. .......... | 356/246 |
| 2003/0035352 A1 * | 2/2003 | Worthington ............ | 369/47.35 |

* cited by examiner

*Primary Examiner*—Brian Healy
*Assistant Examiner*—Michael P Mooney
(74) *Attorney, Agent, or Firm*—Bacon & Thomas, PLLC

(57) ABSTRACT

An apparatus for detecting non-uniform cell gap in a liquid crystal display panel is disclosed, which comprises a first plate, an axle, and a cell gap detecting unit. A surface of the first plate has at least one holding mechanism for fixing at least one the liquid crystal display panel onto the first plate. The axle connects to the first plate and is used to rotate the first plate. The cell gap detecting unit detects the cell gap in the liquid crystal display panel.

36 Claims, 4 Drawing Sheets

APPARATUS FOR DETECTING CELL GAP OF A LIQUID CRYSTAL DISPLAY PANEL

BACKGROUND OF THE INVENTION

1. Field of the Invention

The present invention relates to a detecting apparatus and, more particularly, to an apparatus for detecting cell gap of a liquid crystal display panel speedily.

2. Description of Related Art

The conventional liquid crystal injecting method is achieved through follow steps: first aligning and pressing an upper substrate and a lower substrate to form a panel; placing the panel in a liquid crystal tank; and then vacuuming the cell and soaking the panel into a liquid crystal tank to inject liquid crystal into the panel through the effect of pressure difference and capillarity. But, the liquid crystal display panel is getting larger and thinner, the conventional liquid crystal injecting method takes long time and waste liquid crystal material, which increases the manufacturing cost. Another one-drop fill (ODF) method is achieved by dropping liquid crystal directly on a substrate, and then aligning and pressing an upper substrate and a lower substrate to form a liquid crystal display panel (LCD panel). This ODF method can save a lot of liquid crystal filling time and liquid crystal material, especially for super large size panel. However, in the ODF process, if the filling amount of liquid crystal is too much, user will observe gravity mura eventually in a period after processing.

As shown in FIG. 5, a cell gap of a liquid crystal display 91 is defined by spacers 930 between an upper substrate 910 and a lower substrate 920. Most of liquid crystal displays 91 are held vertically on a table 92, therefore, liquid crystal 93 is affected by gravity force 94 continuously. If the filling amount of the liquid crystal 93 is too much or the thickness of the cell gap is not uniform, the liquid crystal 93 will be continuously affected by gravity force to move downward and accumulate at the lower part of the display 91 that causes the failed display image which is called gravity mura. This gravity mura will reduce picture quality and life time of the display.

The gravity mura cannot be found in the early steps of the manufacturing process until a high temperature aging process proceeds. Generally, the gravity mura does not appear immediately due to low fluidity of the viscous liquid crystal and small difference of the non-uniform cell gap. Furthermore, during the high temperature aging process, the spacers, the substrates and the liquid crystal have different coefficient of expansion, therefore, volume of the liquid crystal will extend due to the heat from the high temperature aging process. When liquid crystal is too much, it will change the thickness of the cell gap, which causes the spacers cannot be used for fixing the thickness of the cell gap anymore, and forms an opening. Afterward, the liquid crystal at the upper part starts to accumulate downward to lower part of the liquid crystal display panel via the opening, which forms a liquid crystal display panel with gravity mura problem.

However, after filling the liquid crystal into the cell gap, there are still many complicated processes, such as aligning, pressing and cutting, that need to be performed before high temperature aging process. Moreover, to accumulate the liquid crystal in the lower part of the liquid crystal display panel during the high temperature aging process is taking long time to detect the non-uniform cell gap. Therefore, the entire detection process takes very long time and the panel yield cannot be controlled immediately.

Therefore, it is desirable to provide an apparatus for detecting abnormal gap between substrates of a liquid crystal display panel to mitigate and/or obviate the aforementioned problems.

SUMMARY OF THE INVENTION

An apparatus for detecting non-uniform cell gap of a liquid crystal display panel is disclosed, which comprises a first plate, an axle, and a cell gap detecting unit. A surface of the first plate has at least one holding mechanism for fixing the liquid crystal display panel onto the first plate. The axle connects to the first plate and is used to rotate the first plate. The cell gap detecting unit detects the thickness of the cell gap of the liquid crystal display panel.

The apparatus of the present invention utilizes the centrifugal force to increase the G force to accelerate the diffusion rate of the liquid crystal to shorten the detecting time for detecting the cell gap. In other words, while the first plate is rotating, the cell gap detecting unit immediately detects the change of the cell gap between substrates to find out whether the cell gap appeared non-uniformly, so the technician can correct the problem in real time. Therefore, the detecting apparatus of the present invention can detect several liquid crystal display panels in a meantime, save the detecting time for nun-uniform cell gap, improve the displaying quality of the display, and increase its life time.

The detection apparatus for a liquid crystal display panel of the present invention can further comprise a heating mechanism on the first plate for heating the liquid crystal display panel which is capable of providing heating temperatures from 40° C. to 120° C., and which is used to accelerate the diffusion rate of the liquid crystal in the cell gaps to reduce the overall detection time.

The present invention also provides a method for detecting non-uniform cell gap of a liquid crystal display panel comprises: (A) providing an apparatus for detecting the liquid crystal display panel comprising a first plate, an axle, and a cell gap detecting unit, wherein a surface of the first plate comprises at least one holding mechanism, the axle connected to the first plate for rotating the first plate; (B) using the holding mechanism to fix a liquid crystal display panel onto the first plate; (C) rotating the axle to drive the first plate to operate the liquid crystal display panel; and (D) using the cell gap detecting unit to detect a cell gap in the liquid crystal display panel.

In the apparatus of the present invention for detecting non-uniform gap between substrates, the holding mechanism of the first plate can be a vacuum suction hole, a springy clip or any other fixing structure. The apparatus of the present invention for detecting non-uniform cell gap of a liquid crystal display panel can alternatively further comprises a second plate for securing the liquid crystal display panel between the first plate and the second plate. The detection apparatus of the present invention further comprises a heating mechanism on the second plate for heating the liquid crystal display panel. The heating mechanism can be a heating plate, which is capable of providing heating temperatures from 40° C. to 120° C. Furthermore, the cell gap detecting unit can be any related device such as an optical device.

DETAILED DESCRIPTION OF THE PREFERRED EMBODIMENT

First Embodiment

Detecting Non-Uniform Cell Gap Between Substrates in a Single LCD Panel

Figure 1A:
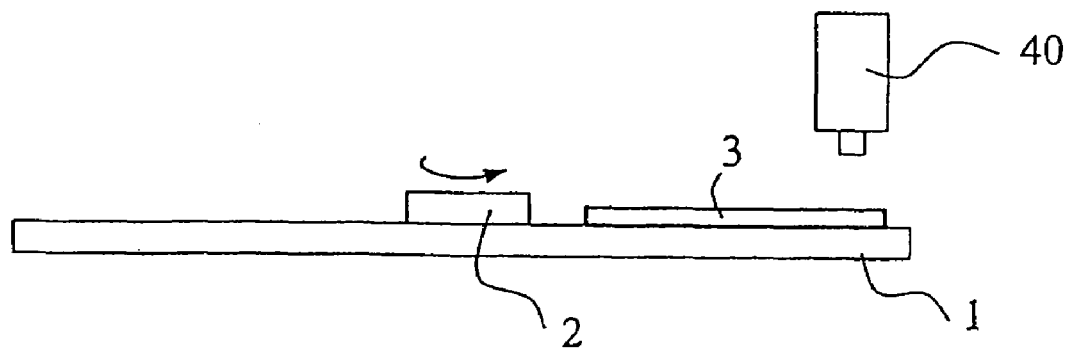
FIG. 1a is a schematic drawing of an embodiment according to the present invention.
Figure 1B:
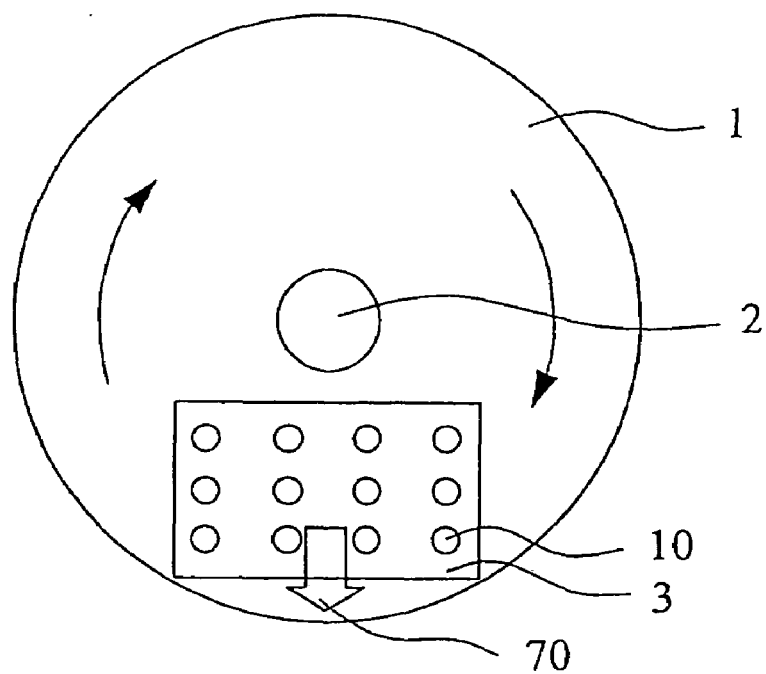
FIG. 1b is a top view of embodiment according to the present invention.

Please refer to FIG. 1a and FIG. 1b. FIG. 1a is a schematic drawing of an embodiment according to the present invention. FIG. 1l is a top view of an embodiment according to the present invention. The apparatus of the present invention is used for detecting non-uniform cell gap between substrates of a liquid crystal display panel. The apparatus for detecting the liquid crystal display panel in this embodiment comprises a first plate 1 and an axle 2 for rotating the first plate 1. The first plate 1 further comprises a plurality of vacuum suction holes 10 on its surface, which are used to hold the liquid crystal display panel 3 (LCD panel) onto the first plate 1. Hence, when the axle 2 drives the first plate 1, the LCD panel 3 is rotated with the first plate 1, which places the LCD panel 3 under a centrifugal force 70. The liquid crystal (not shown) in the LCD panel 3 is affected by the centrifugal force 70, and tends to move along the direction of the centrifugal force 70.

Figure 2:
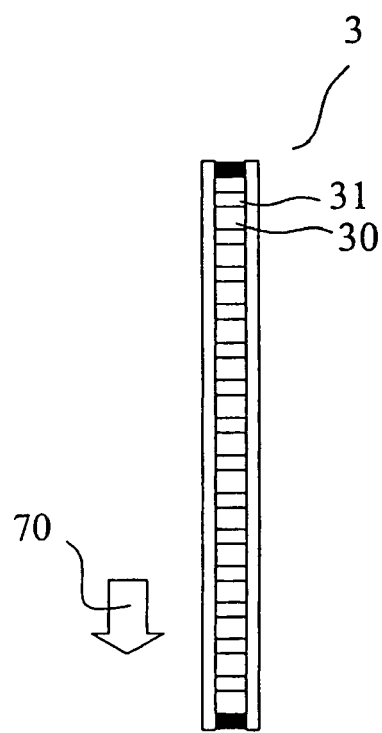
FIG. 2a is a schematic drawing of a normal liquid crystal display panel.
FIG. 2b is a schematic drawing showing gravity mura in a liquid crystal display panel.
Figure 2:
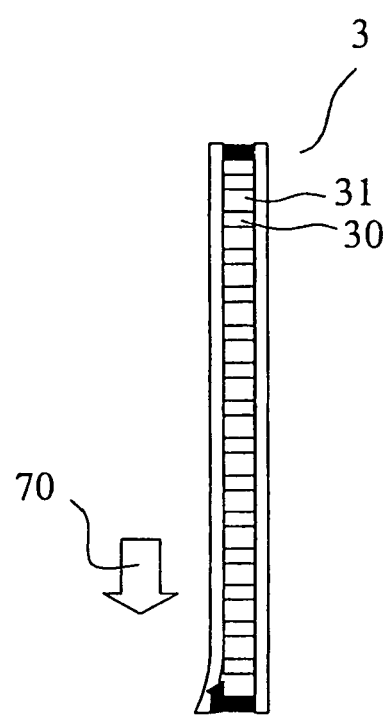

When there is a proper amount of liquid crystal in the LCD panel 3 (as shown in FIG. 2a), the thickness of the cell gap of the LCD panel 3 is defined by spacers 31. Therefore, the liquid crystal 30 will not downwardly accumulate in the lower part of the liquid crystal display panel 3 while the liquid crystal display panel 3 is affected by the centrifugal force 70.

However, when there is too much liquid crystal filled in the LCD panel 3 (as shown in FIG. 2b), the cell gap in the lower part of the LCD panel 3 is defined by the liquid crystal 30, which causes different thickness of cell gap. Therefore, when the liquid crystal 30 is affected by the centrifugal force 70, it moves down and accumulates in the lower part of the LCD panel 3. Consequently, the thickness of the cell gap at the lower portion of the LCD panel 3 increases, which causes gravity mura in panel displaying.

In this embodiment, a radius (r) of the first plate is 1 meter; a rotating speed (ω) of the first plate is 1200 rpm. According to the formula (1)

$$m \times g < m \times r \times \omega^2 \quad (1),$$

The centrifugal force in this embodiment is 41 times stronger than the force of gravity. That is, the LCD panel 3 in this embodiment experiences 41 Gs of centrifugal force, which enlarges the non-uniform cell gap between substrates of the LCD panel. In contrast, the high temperature aging process in the conventional manufacturing process has only the force of gravity (1 G) affecting the liquid crystal. The detecting apparatus for an LCD panel in this embodiment utilizes centrifugal force to increase the G value to shorten the detection time.

The detection apparatus for a liquid crystal display panel (shown in FIG. 1a) further comprises a cell gap detecting unit 40 for detecting changes to the cell gap in the LCD panel 3 to immediately determine whether there is too much liquid crystal. Therefore, in this embodiment, the detecting apparatus for the liquid crystal display panel is applied after the pressing and cutting processes for the LCD panel to determine if the amount of liquid crystal is sufficient. This embodiment thus not only shortens the entire processing time, but also prevents costs associated with manufacturing waste. In contrast, the prior art process does not detect non-uniform cell gap of the LCD panel until application of the high temperature aging process, and many complicated steps exist between these two processes. Therefore, the entire prior art process for the LCD panel takes a long time to perform, and the panel yield cannot be immediately controlled. However, the detecting apparatus for an LCD panel of the present invention shortens the detecting time and controls the panel yield.

Second Embodiment

Figure 3:
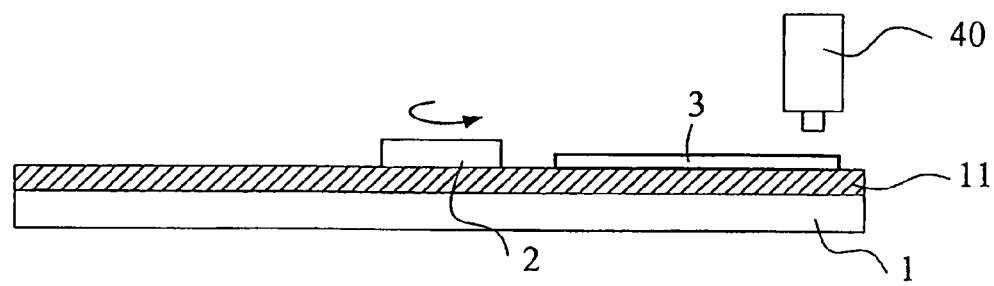
FIG. 3 is a schematic drawing of another embodiment of the present invention.

Detecting Non-Uniform Cell Gap Between Substrates in a Single Liquid Crystal Display Panel FIG. 3 is a schematic drawing of another embodiment of the present invention. The detection apparatus for an LCD panel of this embodiment further comprises a heating mechanism 11 on the first plate 1 for heating the liquid crystal display panel. The heating mechanism 11 of the embodiment is a heating plate, which is capable of providing heating temperatures from 40° C. to 120° C, and which is used to accelerate the diffusion speed of the liquid crystal in the cell gap to reduce the overall detection time.

In this embodiment, the radius (r) of the first plate remains 1 meter, but the rotating speed (ω) of the first plate is increased to 1800 rpm; according to formula (1), the centrifugal force in this embodiment is 92 times stronger than the force of gravity. Moreover, the heating plate causes the liquid crystal 30 in the cell gap to diffuse faster. The cell gap detecting unit 40 then detects changes to the cell gap in the LCD panel 3 to immediately determine whether there is too much liquid crystal. The detection apparatus for a liquid crystal display panel thus shortens the detection times and controls the panel yield.

Third Embodiment

Detecting A Plurality of Liquid Crystal Display Panels

Figure 4:
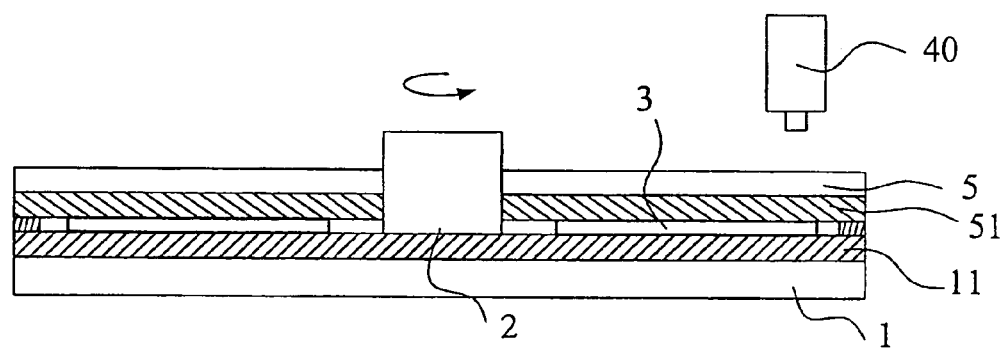
FIG. 4 is a schematic drawing of another embodiment of the present invention.
Figure 5:
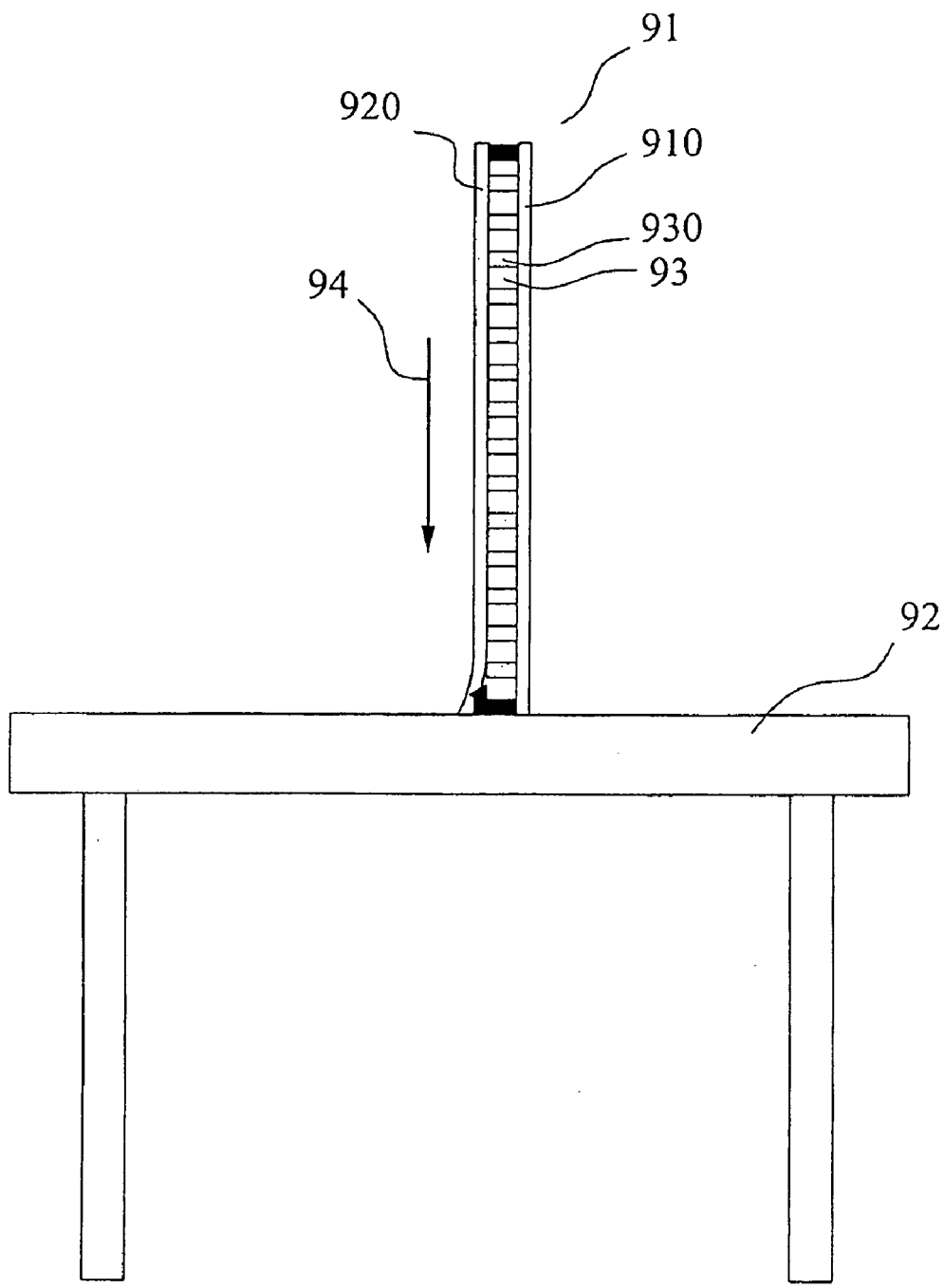
FIG. 5 is a schematic drawing showing gravity mura in a liquid crystal display panel.

FIG. 4 is a schematic drawing of another embodiment of the present invention. The detection apparatus for a liquid crystal display panel of this embodiment further comprises a second plate 5 and a heating mechanism 51. The second plate 5 in this embodiment is used for more securely fixing the LCD panel. The heating mechanism 51 of the embodiment is a heating plate which is capable of providing heating temperatures between 40° C. and 120° C., and which is used to heat the LCD panel 3 that is placed between the first plate 1 and the second plate 5.

The result of this embodiment is identical with the previous embodiments, which utilizes the centrifugal force to increase the G force and the heating mechanism to accelerate the liquid crystal fluid to shorten detecting time for non-uniform cell gap.

Furthermore, the detecting apparatus for the LCD panel of this embodiment has a larger radius (r) of the first plate 1. Therefore, the detecting apparatus of the present invention can detect several LCD panels and shorten the detecting time for non-uniform cell gap.

Although the present invention has been explained in relation to its preferred embodiment, it is to be understood that many other possible modifications and variations can be made without departing from the spirit and scope of the invention as hereinafter claimed.

What is claimed is:

1. An apparatus for detecting a cell gap of a liquid crystal display panel comprising:
   a first plate, a surface of the first plate comprising at least one holding mechanism for holding at least one liquid crystal display panel onto the surface of the first plate;
   an axle connected to the first plate to rotate the first plate; and
   a cell gap detecting unit for detecting a cell gap of the liquid crystal display panel.

2. The apparatus as claimed in claim 1, wherein the holding mechanism is a vacuum suction hole.

3. The apparatus as claimed in claim 1, wherein the holding mechanism is a springy clip.

4. The apparatus as claimed in claim 1, further comprising a second plate for securing the liquid crystal display panel between the first plate and the second plate.

5. The apparatus as claimed in claim 1, wherein the first plate further comprises a heating mechanism for heating the liquid crystal display panel.

6. The apparatus as claimed in claim 5, wherein the heating mechanism is a heating plate.

7. The apparatus as claimed in claim 6, wherein a heating temperature of the heating plate is between 40° C. and 120° C.

8. The apparatus as claimed in claim 4, wherein the second plate further comprises a heating mechanism for heating the liquid crystal display panel.

9. The apparatus as claimed in claim 8, wherein the heating mechanism is a heating plate.

10. The apparatus as claimed in claim 9, wherein a heating temperature of the heating plate is between 40° C. and 120° C.

11. A method for detecting a cell gap of a liquid crystal display panel comprising:
    (A) providing an apparatus for detecting the liquid crystal display panel comprising a first plate, an axle, and a cell gap detecting unit, wherein a surface of the first plate comprises at least one holding mechanism, the axle connected to the first plate for rotating the first plate;
    (B) using the holding mechanism to fix a liquid crystal display panel onto the first plate;
    (C) rotating the axle to drive the first plate to rotate the liquid crystal display panel with the first plate; and
    (D) using the cell gap detecting unit to detect a cell gap of the liquid crystal display panel.

12. The method as claimed in claim 11, wherein the holding mechanism in said step (A) is a springy clip.

13. The method as claimed in claim 11, wherein the apparatus for detecting the liquid crystal display panel in said step (A) further comprises a second plate for securing the liquid crystal display panel between the first plate and the second plate.

14. The method as claimed in claim 11, wherein the first plate in said step (A) further comprises a heating mechanism for heating the liquid crystal display panel.

15. The method as claimed in claim 14, wherein the heating mechanism is a heating plate.

16. The method as claimed in claim 15, wherein a heating temperature of the heating plate is between 40° C. and 120° C.

17. The method as claimed in claim 13, wherein the second plate further comprises a heating mechanism for heating the liquid crystal display panel.

18. The method as claimed in claim 17, wherein the heating mechanism is a heating plate.

19. The method as claimed in claim 18, wherein a heating temperature of the heating plate is between 40° C. and 120° C.

20. An apparatus for detecting a cell gap of a liquid crystal display panel comprising:
    a first plate, a surface of the first plate comprising at least one holding mechanism for holding at least one liquid crystal display panel onto the surface of the first plate, and a heating mechanism for heating the liquid crystal display panel;
    an axle connected to the first plate to rotate the first plate; and
    a cell gap detecting unit for detecting a cell gap of the liquid crystal display panel.

21. The apparatus as claimed in claim 20, wherein the holding mechanism is a vacuum suction hole.

22. The apparatus as claimed in claim 20, wherein the holding mechanism is a springy clip.

23. The apparatus as claimed in claim 20, further comprising a second plate for securing the liquid crystal display panel between the first plate and the second plate.

24. The apparatus as claimed in claim 20, wherein the heating mechanism is a heating plate.

25. The apparatus as claimed in claim 24, wherein a heating temperature of the heating plate is between 40° C. and 120° C.

26. The apparatus as claimed in claim 23, wherein the second plate further comprises a heating mechanism for heating the liquid crystal display panel.

27. The apparatus as claimed in claim 26, wherein the heating mechanism is a heating plate.

28. The apparatus as claimed in claim 27, wherein a heating temperature of the heating plate is between 40° C. and 120° C.

29. A method for detecting a cell gap of a liquid crystal display panel comprising:
    (A) providing an apparatus for detecting the liquid crystal display panel comprising a first plate, an axle, and a cell gap detecting unit, wherein a surface of the first plate comprises at least one holding mechanism and a heating mechanism for heating the liquid crystal display panel, the axle connected to the first plate for rotating the first plate;
    (B) using the holding mechanism to fix a liquid crystal display panel onto the first plate;
    (C) rotating the axle to drive the first plate to rotate the liquid crystal display panel with the first plate; and
    (D) using the cell gap detecting unit to detect a cell gap of the liquid crystal display panel.

30. The method as claimed in claim 29, wherein the holding mechanism in said step (A) is a springy clip.

31. The method as claimed in claim 29, wherein the apparatus for detecting the liquid crystal display panel in said step (A) further comprises a second plate for securing the liquid crystal display panel between the first plate and the second plate.

32. The method as claimed in claim 29, wherein the heating mechanism is a heating plate.

33. The method as claimed in claim 32, wherein a heating temperature of the heating plate is between 40° C. and 120° C.

34. The method as claimed in claim 31, wherein the second plate further comprises a heating mechanism for heating the liquid crystal display panel.

35. The method as claimed in claim 34, wherein the heating mechanism is a heating plate.

36. The method as claimed in claim 35, wherein a heating temperature of the heating plate is between 40° C. and 120° C.

* * * * *